US006473804B1

(12) United States Patent
Kaiser et al.

(10) Patent No.: US 6,473,804 B1
(45) Date of Patent: Oct. 29, 2002

(54) SYSTEM FOR INDEXICAL TRIGGERS IN ENHANCED VIDEO PRODUCTIONS BY REDIRECTING REQUEST TO NEWLY GENERATED URI BASED ON EXTRACTED PARAMETER OF FIRST URI

(75) Inventors: David H. Kaiser, Hillsborough, CA (US); Todd Lash, Oakland, CA (US); Jay C. Weber, Menlo Park, CA (US)

(73) Assignee: Grischa Corporation, Hillsborough, CA (US)

( * ) Notice: Subject to any disclaimer, the term of this patent is extended or adjusted under 35 U.S.C. 154(b) by 0 days.

(21) Appl. No.: 09/232,750

(22) Filed: Jan. 15, 1999

(51) Int. Cl.[7] ............................................... G06F 15/16
(52) U.S. Cl. ..................... 709/245; 709/238; 709/227
(58) Field of Search ................................ 725/110, 105; 709/203, 229, 245, 238, 227

(56) References Cited

U.S. PATENT DOCUMENTS

| 4,573,072 A | 2/1986 | Freeman |
| 4,602,279 A | 7/1986 | Freeman |
| 4,847,698 A | 7/1989 | Freeman |
| 4,918,516 A | 4/1990 | Freeman |
| 5,534,911 A | 7/1996 | Levitan |
| 5,537,141 A | 7/1996 | Harper |
| 5,585,858 A | 12/1996 | Harper |
| 5,632,007 A | 5/1997 | Freeman |

(List continued on next page.)

FOREIGN PATENT DOCUMENTS

| EP | 0 596 823 A2 | 5/1994 |
| EP | 0 810 790 A2 | 12/1997 |
| WO | WO 97/38529 | 10/1997 |
| WO | WO 97/41690 | 11/1997 |
| WO | WO 97/47143 | 12/1997 |
| WO | WO 98/17064 | 4/1998 |

OTHER PUBLICATIONS

Zigmond, et al., "Linking Television to the Internet: EIA–746 and Beyond", WebTV Networks, Inc., IEEE, 1998, pp. 282–283.

(List continued on next page.)

Primary Examiner—Krisna Lim
(74) Attorney, Agent, or Firm—Blakely, Sokoloff, Taylor & Zafman, LLP

(57) ABSTRACT

Disclosed are a method apparatus and system for providing addressed network content in connection with a video production. A disclosed method includes receiving a first request from a reproducing apparatus, for example a set-top box, the first request having been extracted from a video production communicated to the reproducing apparatus; determining a second resource identifier responsive to the first request and redirecting the first request wherein a response is provided to the reproducing apparatus. A resource identifier used in the first request is an 'indexical' resource identifier in that it specifies a path to be used by a server that is independent (or substantially independent) of content received in response to providing a request to the resource identifier. Determining a second resource identifier may involve creating a resource identifier that includes one or more parameter-parameter value pairs. An apparatus according to the invention may be a server or other computer programmed to handle the indexical request and provide response content. A system according to the disclosure may include the server and a facility for communicating the video production. Additionally disclosed aspects include a method for creating a video production that includes indexical resource identifiers and a method and system for encoding one or more series of resource identifiers in a video production.

15 Claims, 8 Drawing Sheets

U.S. PATENT DOCUMENTS

| | | | |
|---|---|---|---|
| 5,682,196 A | | 10/1997 | Freeman |
| 5,708,845 A | | 1/1998 | Wistendahl |
| 5,724,091 A | | 3/1998 | Freeman |
| 5,740,549 A | | 4/1998 | Reilly |
| 5,745,360 A | | 4/1998 | Leone |
| 5,751,956 A | | 5/1998 | Kirsch |
| 5,760,838 A | | 6/1998 | Adams et al. |
| 5,761,606 A | | 6/1998 | Wolzien |
| 5,774,664 A | | 6/1998 | Hidary |
| 5,774,666 A | | 6/1998 | Portuesi |
| 5,774,670 A | | 6/1998 | Montulli |
| 5,778,181 A | | 7/1998 | Hidary |
| 5,794,207 A | | 8/1998 | Walker |
| 5,812,769 A | * | 9/1998 | Graber et al. ................ 705/14 |
| 5,812,776 A | * | 9/1998 | Gifford ....................... 709/203 |
| 5,818,441 A | | 10/1998 | Throckmorton et al. |
| 5,818,935 A | | 10/1998 | Maa |
| 5,848,396 A | | 12/1998 | Gerace |
| 5,861,881 A | | 1/1999 | Freeman |
| 5,864,604 A | | 1/1999 | Moen |
| 5,864,823 A | | 1/1999 | Levitan |
| 5,907,322 A | | 5/1999 | Kelly |
| 5,964,829 A | * | 10/1999 | Ozden et al. ................ 709/102 |
| 5,978,817 A | * | 11/1999 | Giannandrea et al. ...... 707/501 |
| 6,012,080 A | * | 1/2000 | Ozden et al. ................ 709/102 |
| 6,018,768 A | | 1/2000 | Ullman |
| 6,064,438 A | | 5/2000 | Miller |
| 6,070,191 A | * | 5/2000 | Narendran et al. ......... 709/217 |
| 6,154,738 A | * | 11/2000 | Call ............................ 705/20 |
| 6,240,555 B1 | * | 5/2001 | Shoff et al. ................. 725/110 |

OTHER PUBLICATIONS

Pending Application: Ser. No. 09/231,283 entitled: "A Method, System, and Apparatus for Providing Action Selections to an Image Referencing a Product in a Video Production"; filed Jan. 15, 1999.

Search Report of a Corresponding PCT Application PCT/US/00/00017.

Simonson, J. et al: "Version augmented URIs for reference permanencevia [sic]0 an Apache module design" Computer Networks and ISDN Systems, NL, North Holland Publishing, Amsterdam, vol. 30, No. 1–7, Apr. 1, 1998.

Rio, M. et al: "A framework for broadcasting and management of URIs" Computer Networks and ISDN Systems, NL, North Holland Publishing, Amsterdam, vol. 28, No. 4, Feb. 1, 1996.

"Interactive Television & WebTV® Plus;" retrieved 11/98; retrieved from Internet <http://developer,webtv.net/docs/ITV/ITV.html>.

"Interactive Television Programming Examples;" retrieved 11/98; retrieved from Internet <http://developer.webtv.net/docs/ITV/examples.html>.

"Embedding and Overlaying Web Pages in a TV Broadcasat;" retrieved 11/98; retrieved from Internet <http://developer.webtv.net/docs/ITV/tvURL.html>.

"Uniform Resource Locators for Television Broadcasts;" retrieved 11/98; retrieved from Internet <http://developer.webtv.net/docs/ITV/draft–zigmond–tv–url–00.txt>.

"Interactive Television Links;" retrieved 11/98; retrieved from Internet <http://developer.webtv.net/docs/ITV/links.html>.

* cited by examiner

SYSTEM FOR INDEXICAL TRIGGERS IN ENHANCED VIDEO PRODUCTIONS BY REDIRECTING REQUEST TO NEWLY GENERATED URI BASED ON EXTRACTED PARAMETER OF FIRST URI

CROSS-REFERENCES

This application is related to an application entitled, "A Method, System, and Apparatus for Providing Action Selections to an Image Referencing a Product in A Video Production," application Ser. No. 09/231,283, filed Jan. 15, 1999, and which is incorporated herein in its entirety by this reference.

BACKGROUND

1. Field

The invention relates generally to enhanced video and more particularly to the handling of resource identifiers used in connection with enhanced video.

2. Background

Enhanced Video including Enhanced Television involves a developing set of technologies directed towards providing viewers rich and customizable interaction options in connection with elements of a video production. Conventional means of providing the enhancing interactive content involve integrated devices capable of receiving and reproducing the video production and of interactive communications with resources available over a data network.

Examples of such integrated devices are found in the current generation of, so called, "set-top boxes." Given the high rate of television ownership, consumer familiarity with, and appreciation of, television, conventional Enhanced Video solutions frequently operate with widely used television broadcast signals. Such solutions typically involve encoding one or more resource identifiers into non-viewed portions of the television broadcast signals. The resource identifiers are then extracted by the integrated device which then presents to the viewer in some manner the option of interacting with enhancing resources available via the resource identifier.

Frequently, the resource identifiers are encoded in the vertical blanking interval ("VBI") of a television broadcast signal. An industry standard provided from the Electronic Industries Association ("EIA") of Arlington, Va., U.S.A. defines a system for the transport of internet Uniform Resource Locator ("URL") information using the Text-2 service of line 21 of the VBI.

The EIA standard syntax provides that the general format for transport of URL information in the VBI is to provide the URL followed by zero or more pairs of attributes and values which is then followed by a checksum. The EIA standard further indicates that, in order to preserve sufficient bandwidth for other services that use line 21 of the VBI, URL information should be limited.

Limitation on URL information can be inconvenient. While resource identifiers, including URLs, can be compact, it may be desirable that they be quite lengthy. For example, GET-based forms in compliance with the Hypertext Transfer Protocol ("HTTP") commonly involve URLs that are quite lengthy. It may also be desirable to include numerous parameter-parameter value pairs in a resource identifier to provide greater customization of interactions. It is therefore desirable that a solution exist that allows enhancing content customization through use of lengthy or parameterized resource identifiers without consuming limited bandwidth in a video production.

Another problem that arises in connection with Enhanced Video is synchronization of the content of the video production with the enhancing content. This may take on many forms. Some examples are created by the passage of time between creation of the video production and the time when enhancing interaction is desired. For example, a television program may be originally created with encoded resource identifiers to enhancing content relating to a promotion for the latest model of a vendor's product. After the passage of time, for example when the program were broadcast again as a re-run the following year, the resource identifier may no longer address the vendor's latest product because newer versions may have been released during the intervening time period. The same type of problem can arise in the context of an instructional video production. For example, the originally created encoded resource identifiers may address the scholarship, regulations, or additional instructional content appropriate at the time the video production was created. However after the passage of time, these same resource identifiers could provide enhancing content that was misleading. It would thus be advantageous that a solution exist that allows for time-appropriate enhancing content to be provided in connection with an enhanced video production.

A different time-related synchronization problem that may arise in connection with Enhanced Video stems from an inability to provide resource identifiers to appropriate enhancing content by the time for broadcast of the video production; for example, a live video feed from a sporting or news event. As the event unfolds, opportunities may arise where it would be desirable to provide enhancing content. However, it is may be impossible to predict all contingencies for which it would be desirable to provide opportunistic enhancing content. For example, during a baseball game a triple play may occur and it may be desirable to provide enhancing content about other triple plays, statistics, and the like which are available in data storage of the broadcaster or an affiliated entity. However, it would impractical or burdensome to provide resource identifiers directly to these resources. Accordingly, it would be beneficial that a solution exist that allows for opporuntistic provision of enhancing content.

Yet another problem that may arise in connection with Enhanced Video is that of appropriate internationalization. Video events frequently draw international audiences, for example, Olympic and other sporting competitions, space exploration, and international conflicts. The author or publisher of video productions of such events may desire to provide distinct enhancing content for different national, or linguistic groups. However it may be inconvenient or impossible to provide separate resource identifiers in the video production for each group. Therefore it would be favorable for a solution to exist that facilitates internationalization of enhancing content.

In connection with Enhanced Video, it is further desirable that a method and system exist for providing resource identifiers to support an enhanced video production in advance of having any enhancing content and/or in advance of an arrangement that a particular entity will provide enhancing content. For example, an author of a video production may desire to generate revenue by, for example, selling the rights to provide enhancing content in connection with one or more particular resource identifiers. Such an author would desire a method and system that would allow the author to embed resource identifiers in the author's video production in a manner that would allow the author (or other entity holding appropriate rights) to sell the rights to provide enhancing content to one or several parties after creation of the video production. Conventional methods are unable to provide a solution to such an author in that typical resource identifiers specify a path that is dependent on the particular content associated with the resource identifier. Conventional redirection is also unable to provide a solution to such an author because the author may sell the rights to provide enhancing content to several different entities. Each of the several different entities would typically desire to have requests for enhancing content initiated in response to selection of a resource identifier for which the entity owned the right to provide enhancing content directed to the entity's server; conventional redirection is unable to provide a solution to this type of problem.

SUMMARY

In order to provide a solution to the forgoing and additional problems, aspects of our invention provide a method, apparatus, and system for indexical triggers in enhanced video productions.

A conforming method may include, at least: receiving a first request from an integrated enhanced video device (the first request includes, at least, a first resource identifier and the first resource identifier is extracted from a video production provided to the enhanced video device); also, determining a second resource identifier in response to the first resource identifier; and also, redirecting the first request to the second resource identifier; and thereafter a response is sent to the integrated enhanced video device. In accordance with a conforming method, determining a second resource identifier may include, at least: identifying at least one parameter; also, identifying at least one parameter value associated with the at least one parameter; and also, determining a second resource identifier that includes, at least, the parameter(s) and parameter value(s) in response to the first resource identifier. In accordance with a conforming method, determining a second resource identifier may include, at least: identifying a parameter of a first type and a parameter of a second type (the parameter of a second type identified in response to a header in the request); and also, identifying a first parameter value associated with the parameter of a first type and a second parameter value associated with the parameter of a second type (the first parameter value is identified in response to an expression associated with the header). In accordance with a conforming method, redirecting the first request may be either an internal redirection or an external redirection; if external, it may be to a separate server or to the enhanced video device.

A conforming system may include, at least: a video production communication device; also, an enhanced video device configured to receive a video production from the video production communication device (the video production including, at least, a first resource identifier) and send a request including, at least, the resource identifier via a data network; also, a first server communicating via the data network, the first server configured to receive the request, determine a second resource identifier, and redirect the request to the second resource identifier. A conforming system may also include a second server, and the second resource identifier may be addressable via the second server.

A conforming apparatus including, at least, a processor, a storage, and an-input output system may be a computer. Programmed instructions may configure the computer to provide special purpose computing machinery including, at least, a first request receiver for receiving a first request from a reproducing apparatus, said first request comprising a first resource identifier, said first resource identifier extracted from a video production communicated to said reproducing apparatus; a second resource identifier determiner for determining a second resource identifier responsive to said first resource identifier; and a first request redirector for redirecting said first request to said second resource identifier, wherein thereafter a response is communicated to said reproducing apparatus. The second resource identifier determiner may included, at least, a parameter identifier for identifying a parameter; a parameter value identifier for identifying a parameter value associated with said parameter; and a second resource identifier determiner for determining a second resource identifier comprising said parameter and said parameter value responsive to said first resource identifier. The second resource identifier determiner may included, at least, a parameter identifier for identifying a parameter of a first type and a parameter of a second type, wherein said parameter of a first type is identified responsive to a header in said first request; and a parameter value identifier for identifying a first parameter value associated with said parameter of a first type and a second parameter value associated with said parameter of a second type, wherein said first parameter value is identified responsive to an expression associated with said header. The first request redirector may be, at least, an internal redirector, or an external redirector. If an external redirector, an external redirect message may be sent to the reproducing apparatus.

A conforming method of creating a video production including indexical content references may include, at least: selecting an indexical reference corresponding to a resource identifier addressable on a data network; determining a reference location in a video production; and encoding said indexical reference at said reference location in said video production, wherein when said video production is reproduced on a compatible reproducing apparatus, said reproducing apparatus communicates a first request to said resource identifier, a server addressable via said resource identifier generates a current content reference, a second request is sent to said current content reference, and responsive to said second request information is communicated to said reproducing apparatus.

An additional aspect of versions of the invention provides a system for encoding one or more series of resource identifiers in a video production. A conforming system includes, at least: an encoding controller; a video production player, operation of the video production player under control of the encoding controller; a resource identifier encoder, the resource identifier encoder configured to receive an input video signal from the video production player, the resource identifier encoder further configured to encode resource identifiers in the input video signal in response to encoding instructions from the encoding controller and provide an output video signal comprising the input video signal and the resource identifiers; and a video production recorder, operation of the video production recorder under control of the encoding controller, the video production recorder receiving the output video signal and storing said output video signal in a storage medium.

Yet another aspect of versions of the invention provides a method for encoding one or more series of resource identifiers in a video production. A conforming method includes, at least: receiving a first starting position for a first series; receiving a first encoding pattern for the first series; embedding a first resource identifier at the first starting position; and embedding the first series of one or more resource identifiers in the video production in accordance with the first starting position. A conforming method may further include, at least: receiving a second starting position for a second series; receiving a second encoding pattern for the second series; embedding a second resource identifier at the second starting position; and embedding the second series of one or more resource identifiers in the video production in accordance with the second starting position. Encoding patterns in conforming methods may be fixed intervals. Resource identifiers in series may be identical.

BRIEF DESCRIPTION OF THE DRAWINGS

These and other features, aspects, and advantages of the present invention will become better understood with regard to the following description, appended claims, and accompanying drawings where:

DETAILED DESCRIPTION

While this invention is susceptible of embodiment in many different forms, there is described herein in detail features of illustrative embodiments with the understanding that the present disclosure is to be considered as an example of the principles of the invention and is not intended to limit the invention to the embodiments illustrated.

Notations http://<server name>/<videoprod>/<position>  (1)

http://<server name>/p/<project>/<name1>=<value1>/<name2>=<value2>/<name3>=/start.html  (2)

Description of Figures

Figure 1:
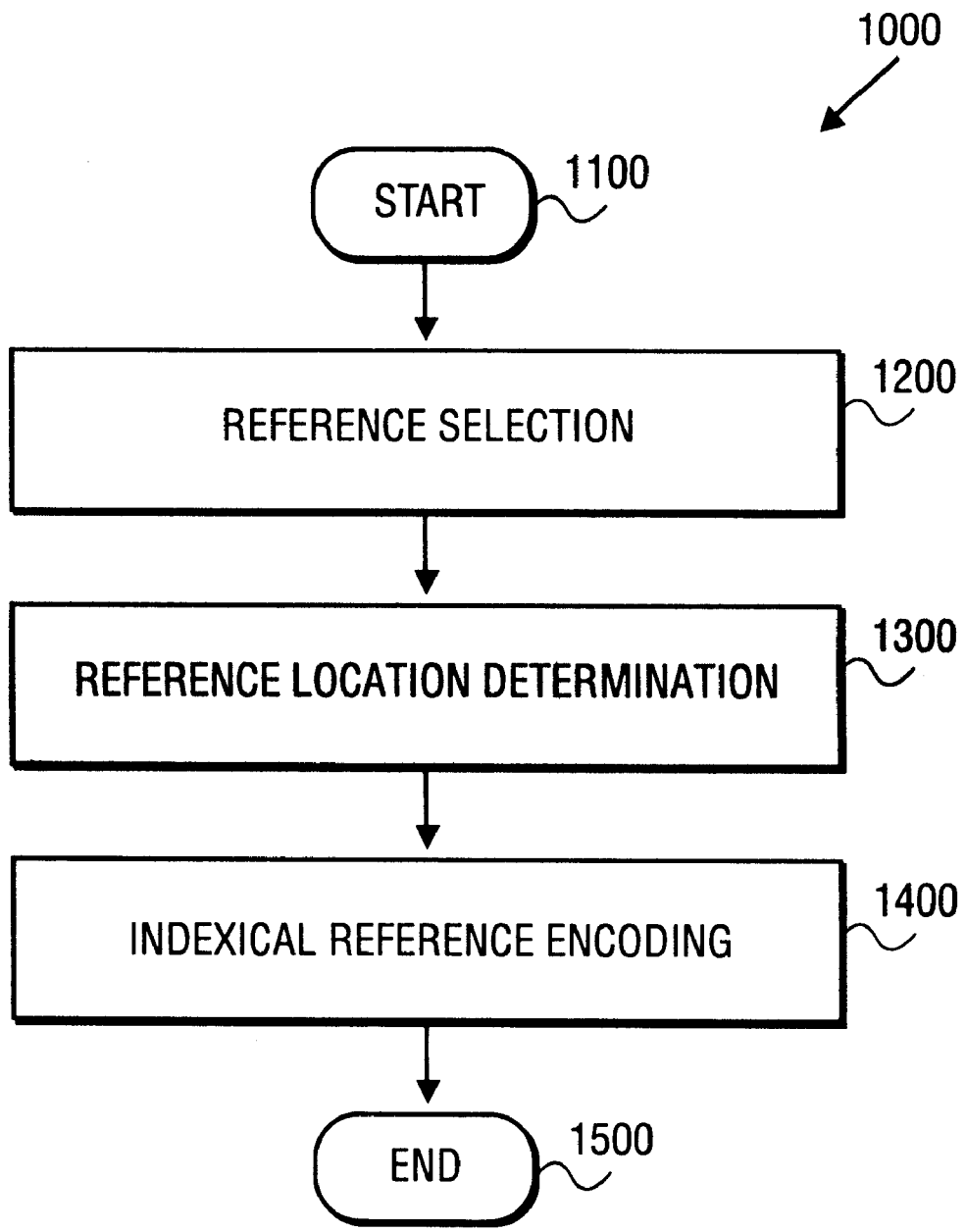
FIG. 1 depicts a flow diagram for a method of creating a video production including indexical content references in accordance with an illustrative embodiment.

One aspect of the present invention creates a video production comprising indexical content references. FIG. 1 depicts a flow diagram of a method for creating a video production including indexical content references 1000 in accordance with an illustrative embodiment. A video production including an indexical content reference, when reproduced on compatible equipment such as a reproducing apparatus 2300 (described below) engages the equipment initiate a request to a resource identifier included in the indexical content reference wherein a server addressable via a data network generates a current content reference. Another request is sent to the current content reference and responsive thereto, a response is communicated to the compatible equipment, e.g., the reproducing apparatus 2300.

Process flow initiates at a 'start' terminal 1100 and continues to an 'indexical reference selection' procedure 1200. The 'indexical reference selection' procedure 1200 comprises selection of an indexical reference to be encoded in the video production. Selection may be by a human operator or may be automated. Next, processing continues to a 'reference location determination' procedure 1300 that comprises determining the location within the video production where the indexical reference selected by the 'indexical reference selection' procedure 1200 can be encoded. The 'reference location determination' procedure 1300 may also be performed by a human operator or may be automated. One of skill in the art will recognize many schemes for determining the location within the video production where the indexical reference may be encoded including, for example, time or position-based schemes, and content-based schemes. Additionally, a zone-based scheme may be used, as taught by a patent application entitled "A Method, System, and Apparatus For Providing Action Selections to an Image Referencing A Product in A Video Production," filed concurrently herewith, by inventors David Kaiser, Todd Lash, and Jay Weber.

Process flow continues to an 'indexical reference encoding' procedure 1400 that comprises encoding the indexical reference selected by the 'indexical reference selection' procedure 1200 at the location in the video production determined by the 'reference location determination' procedure 1300. The video production may be in many conventional forms and conventional video editing equipment known to those skilled in the art may be used to encode the indexical reference. Conveniently, the indexical reference may be encoded in the vertical blanking interval ("VBI") of a conventional analog television broadcast using conventional closed-captioning systems. The Text-2 service of line 21 of the VBI may be used in accordance with CEMA standard EIA-746 (available from the Electronic Industries Association ("EIA") of Arlington, Va., U.S.A.). When the video production is in other forms including, for example, digital broadcast or narrowcast video, HDTV, encoded on a tangible medium, or a file for use with a video application, encoding schemes suitable to the form should be used and one of skill in the art will recognize how to encode an indexical reference in accordance with the invention in many conventional forms of distributing the video production. Process flow completes through an 'end' terminal 1500.

Figure 2:
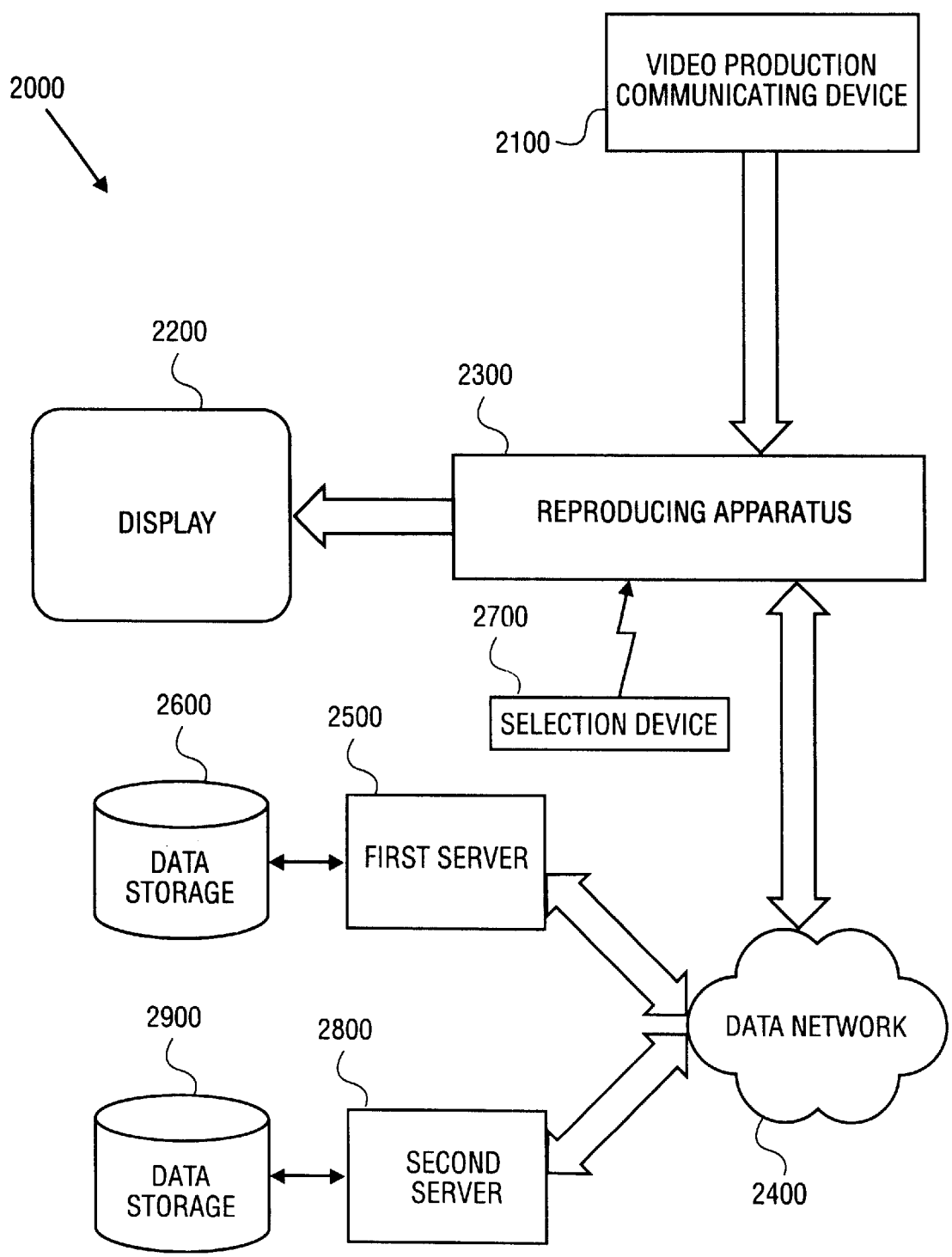
FIG. 2 is a block diagram of elements in an operating environment of an illustrative embodiment.

A video production created according to the method for creating a video production including indexical content references 1000 may be used with other aspects of the invention including, for example, those depicted in FIG. 2. FIG. 2 depicts a block diagram of the elements in an operating environment of a system 2000 in accordance with an illustrative embodiment. A video production communicating device 2100 communicates a video production comprising a trigger to a reproducing apparatus 2300. The reproducing apparatus 2300 is described in greater detail in connection with FIG. 4. In the illustrative embodiment the video production is communicated to the reproducing apparatus 2300 with a broadcast network, in a more preferred embodiment the broadcast network is a television network; in a still more preferred embodiment, the video production is broadcast is a National Television Standards Committee ("NTSC") video signal; PAL, SECAM, or high-definition television formats could also be used.

The video production may be distributed in a tangible medium, examples of a tangible medium including, for example, video tape, video disc, or digital video disc (DVD), or other memory product. In other embodiments the video production is transferred over a computer network. Some embodiments stream the video production and in others all, or substantially all, of a file comprising the video production is transferred before reproduction begins.

The video production communicating device 2100 generates an output operable with the reproducing apparatus 2300. For example, if the video production were by DVD, the video production communicating device 2100 could be a conventional DVD player; if the video production were transferred over a computer network, the video production communicating device 2100 could be a programmed computer. In some embodiments the video production communicating device 2100 may be a broadcast station, either terrestrial or orbiting. One of skill in the art will recognize which structures, for example the DVD player or programmed computer, are suitable to operate with the video production depending on its form.

Generally, the reproducing apparatus 2300 is capable of performing at least two functions: First, receiving the video production communicated by the video production communicating device 2100 and reproducing an information signal comprising the video production to, for example, a display 2200; second, operating as a client for client-server communications which may take place over, for example, a data network 2400.

Typically, the reproducing apparatus 2300 communicates over the data network 2400. The data network 2400 may be the same or a separate transmission medium as that though which the video production communicating device 2100 communicates the video production to the reproducing apparatus 2300, including, for example, a computer network or broadcast, narrowcast, multicast, or multiplexed transmission. In an illustrative embodiment, the data network is the internet; various transport layer protocols may be used, including, for example, the Transmission Control Protocol ("TCP") and the User Datagram Protocol ("UDP"). Additionally various application layer protocols within the knowledge of one of skill in the art may be used including, for example, the hypertext transfer protocol (HTTP). The data network 2400 may, more generally, include other forms of data communication.

Able to communicate with the reproducing apparatus 2300 via the data network 2400 is a first server 2500 and a second server 2800, which may communicate, respectively, with a first data storage 2600 and a second data storage 2900. Generally there need not be functional differences between the first server 2500 and the second server 2800 and accordingly subsequent discussion will be made with reference to the first server 2500 except where additional clarity may be had by reference to the second server 2800. Further, as one of skill will appreciate, not all embodiments require more than one server, and other embodiments may operate with more than two servers. Additional description of illustrative structures that may implement functions of the first server 2500 is provided in connection with FIG. 3.

A selection device 2700 generally operates with the reproducing apparatus 2300. The selection device 2700 may be used, for example, to tune the reproducing apparatus 2300 to receive different video productions or to select from among selectable actions in client-server communications carried on by client functionality in the reproducing apparatus 2300. The remote control used with the WEBTV Plus set-top box is one example of a suitable form for the selection device 2700. Many others will be recognized by those of skill in the art including, for example, pointing devices used with personal computers, other selection systems such as those based on speech recognition, and touch-screen systems.

Figure 3:
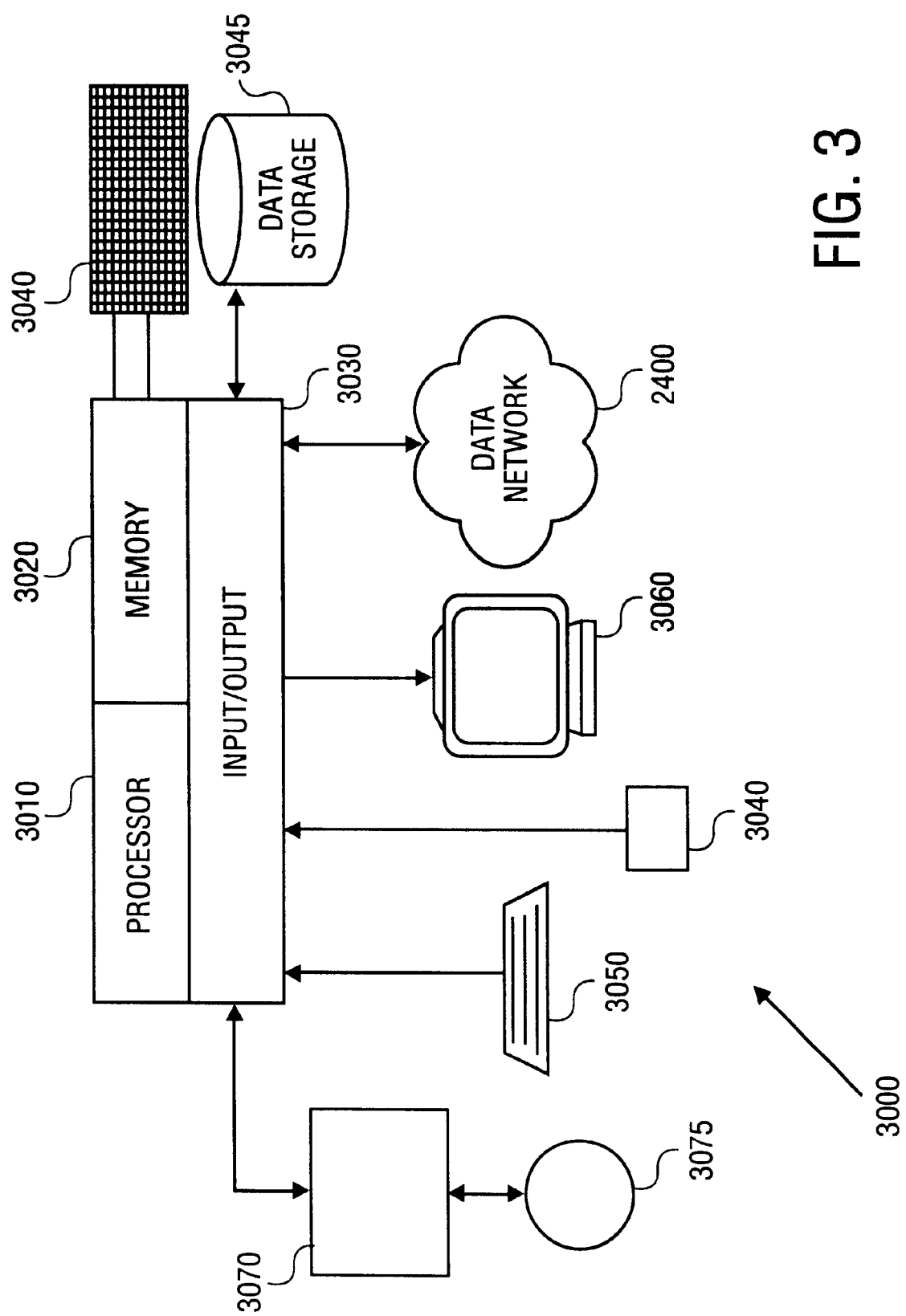
FIG. 3 depicts a computer system capable of being configured to embody aspects of the invention in accordance with an illustrative embodiment.

Methods according to the invention may be computer implemented either in whole or in part. FIG. 3 depicts a computer system 3000 capable of embodying aspects of the invention. The first server 2500 or the second server 2800 may be structures in accordance with the computer system 3000. The computer system 3000 comprises a microprocessor 3010, a memory 3020 and an input/output system 3030. The memory 3020 is capable of being configured to provide a data structure 3040 which may contain data manipulated by the computer system 3000 when embodying aspects of the invention. Further illustrated is a media drive 3070, such as a disk drive, CD-ROM drive, or the like. The media drive 3070 may operate with a computer-usable storage medium 3075 capable of storing computer-readable program code able to configure the computer system 3000 to embody aspects of the invention. The input/output system 3030 may also operate with a keyboard 3050, a display 3060, a pointing device 3090, a data storage 3045, or a network such as the data network 2400. As illustrated, the computer system 3000 is general-purpose computing machinery. As one of skill recognizes, programmed instructions may configure general purpose computing machinery to embody structures capable of performing functions in accordance with aspects of the invention. Special purpose computing machinery comprising, for example, an application specific integrated circuit (ASIC) may also be used. One skilled in the art will recognize, numerous structures of programmed or programmable logic capable of being configured to embody aspects of the invention. In some embodiments, the computer system 3000 is a SPARC-based workstation from Sun Microsystems of Mountain View, Calif., running the SOLARIS operating system and the Apache HTTP server with a Secure Sockets Layer module.

In the illustrative embodiment of the invention, computer program code configures a computer to embody aspects of the invention. So configured, representations of physical quantities and characteristics are manipulated through a series of operations to achieve aspects of a method, apparatus, and system for indexical triggers in enhanced video productions. One skilled in the art will appreciate the distinction between the manipulation of physical quantities and representations thereof within a computer and will quickly apprehend when reference is being made to one or the other.

In an illustrative embodiment, the first server 2500 is an HTTP server. However, one skilled in the art will appreciate that the first server 2500 could be other devices with which the reproducing apparatus 2300 is configured to operate. In illustrative embodiments the first server 2500 communicates with a first data storage 2600. The first data storage 2600 may store, for example, user profile data, product data, merchant data logs, or program guides, data objects comprising parameters or parmeter values, and data objects comprising data operable with programmed instructions for mapping a first request to a second request.

Figure 4:
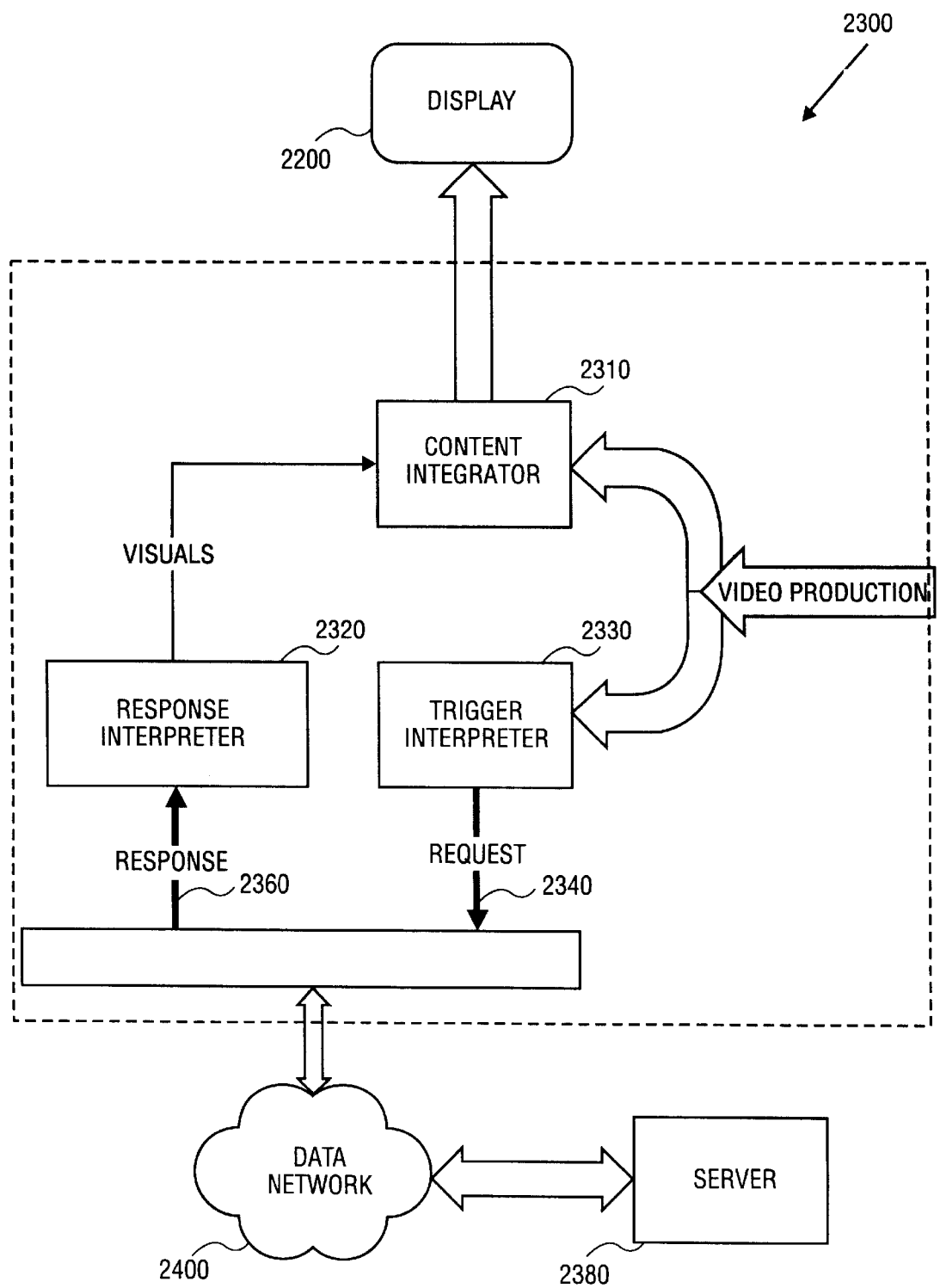
FIG. 4 depicts a reproducing apparatus in accordance with an illustrative embodiment.

Shown in FIG. 4 by general reference numeral is the reproducing apparatus 2300. As noted above, the reproducing apparatus 2300 provides, at least, the functions of receiving and reproducing the video production and of a client in client-server communications. One of skill in the art will recognize numerous structures of programmed or programmable logic also capable of performing these and other functions in accordance with aspects of the invention. Exemplary structures could include, for example, a programmed general purpose computer with suitable video hardware, an integrated receiver/client appliance such as a set-top box, special purpose computing machinery comprising an application specific integrated circuit (ASIC). Structures currently commercially available which provide at least the above-identified functions include, for example, a WEBTV Plus set-top box available from WebTV Networks, Inc. of Palo Alto, Calif., U.S.A. It is contemplated, however, that the present invention will operate with other structures able to perform the above-identified functions (now known or later-developed).

The reproducing apparatus 2300 may communicate with the display 2200 and the data network 2400. In operational mode, the video production communicating device 2100 communicates the video production to the reproducing apparatus 2300. A trigger interpreter 2330 interprets triggers in the video production and extracts a resource identifier. The trigger interpreter 2330 sends a request 2340 comprising the resource identifier via the data network 2400.

A server 2380 receives the request 2340. The server 2380 may be the first server 2500, the second server 2800, or another device addressable via the data network 2400. The reproducing apparatus 2300 receives a response 2360 via the data network 2400 and a response interpreter 2320 parses and renders the response 2360. Rendered visual aspects of the response 2360 are sent to a content integrator 2310 which integrates visual aspects of the response 2360 with visual aspects of the video production for communication to the display 2200.

Figure 5:
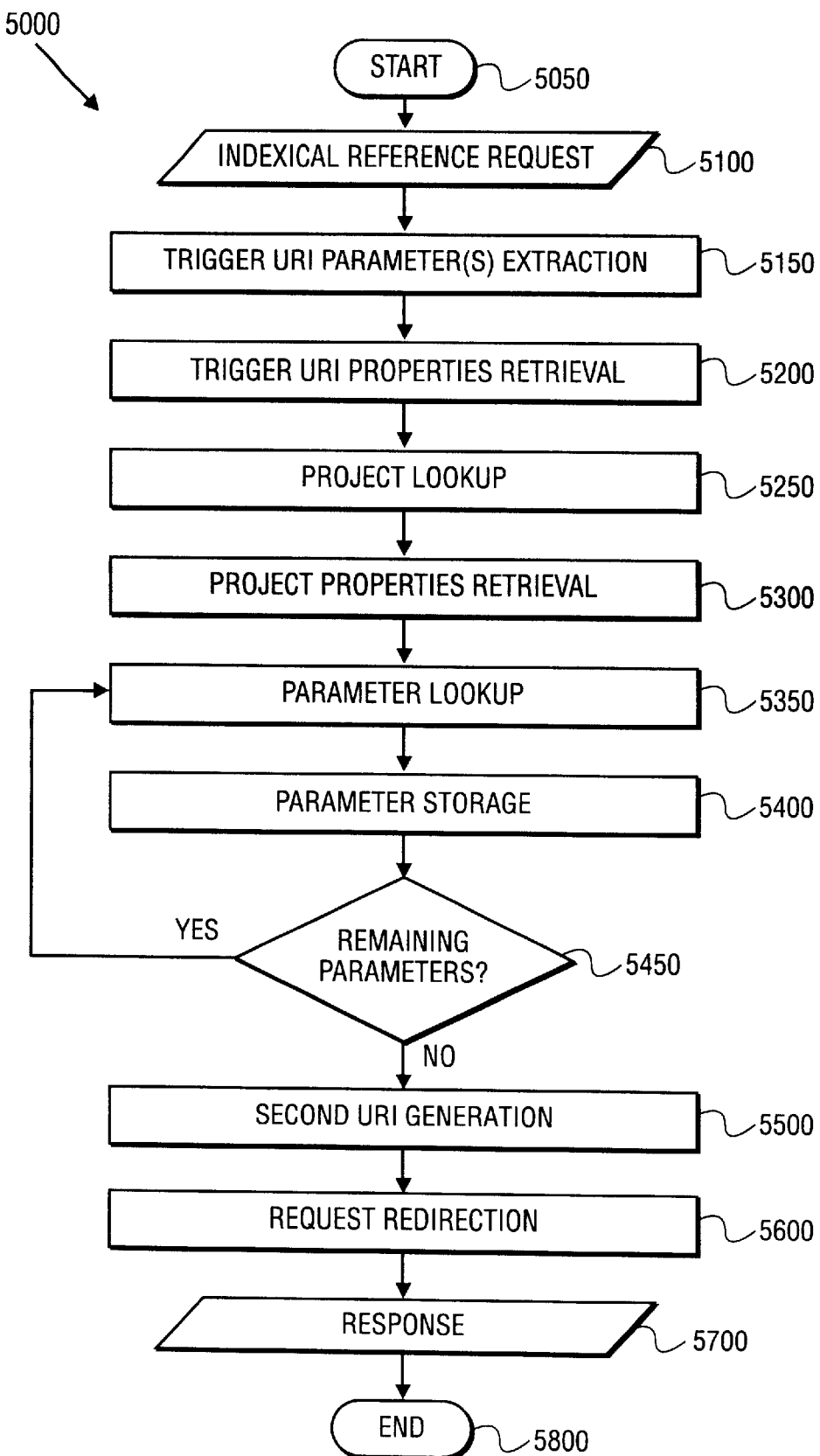
FIG. 5 depicts a flow diagram of a method for providing indexical triggers in an enhanced video production.

FIG. 5 depicts an 'indexical trigger' method 5000 in accordance with an illustrative embodiment. Process flow according to the 'indexical trigger' method 5000 preferably occurs according to programmed instructions executing on networked computing machinery, for example, the first server 2500. The 'indexical trigger' method 5000 may be implemented with one or more server-side scripts or programs including, for example, JAVA servlets or CGI scripts or programs.

Process flow initiates at a 'start' terminal 5050 and continues to an 'indexical reference request' input block 5100. The 'indexical reference request' input block 5100 comprises a request to an addressable network resource such as the request 2340. The request may be compliant with the HTTP protocol in its various versions including, for example, 1.0, draft 1.1, and draft HTTP-NG. It is contemplated that the present invention could also operate with later-developed versions of the HTTP protocol or its successors.

Typically, the request contains, at least, a resource identifier, one or more header field-value pairs which may specify, for example, functional parameters to be used in a client-server session initiated by the request, and a terminator. The resource identifier in the request of the 'indexical reference request' input block 5100 is typically extracted from a trigger. When the request is HTTP compliant, the resource identifier commonly is an uniform resource identifier ("URI") and the one or more header field-value pairs are as specified in the HTTP protocol standard(s).

In some illustrative embodiments, triggers are compliant with CEMA standard EIA-746 available from The Electronic Industries Association of Arlingtion Va., U.S.A. In these embodiments, the resource identifier in the trigger is an uniform resource identifier and the uniform resource identifier in the trigger is of the form:

$$\text{http://<server name>/<videoprod>/<position>} \tag{1}$$

The material denoted with angle-brackets <> are quantities used in accordance with the illustrative embodiment. In (1) above, <server name> may be any server addressable on the data network 2400, including, for example, the first server 2500, conveniently, the server may be a dedicated server; <videoprod> refers to an identifier of the video production or a segment thereof into which the trigger is embedded; <position> refers to a position within the video production. Thus, one particular uniform resource identifier according to (1) could be:

$$\text{http://t.b3tv.com/video7/05} \tag{1a}$$

One of skill in the art having the benefit of this disclosure will appreciate that the present invention is not limited to triggers comprising uniform resource identifiers, and trigger uniform resource identifiers are not limited to the form illustrated in (1) above. One aspect of the present invention is that the resource identifier in the trigger is what is termed herein "indexical".

"Indexical" triggers may refer to triggers that comprise a resource identifier including a path to be used by a server in locating an associated resource that is independent (or substantially independent) of the content addressable by the resource identifier. One of skill in the art will appreciate that indexical triggers comprise resource identifiers that are distinct from the conventional resource identifier used, for example, in connection with World Wide Web sites, where a path specified to be used by a server in locating an associated resource is dependent (or substantially dependent) on the content of resource addressble by the resource identifier. Indeed, is common practice in connection with World Wide Web sites to specify an uniform resource identifier with a path that precisely specifies a path in a filesystem where content (for example an HTML page or image) is stored.

One manner in which indexical resource identifiers may be made independent (or substantially independent) from the content addressable by the resource identifier is for the path of the resource identifier to indicate the medium in which the resource identifier is embedded, for example, the path may indicate that the resource identifier is embedded in a video broadcast.

Yet another manner in which indexical resource identifiers may be made independent (or substantially independent) from the content addressable by the resource identifier is for the path of the resource identifier to indicate the broadcast context in which the resource identifier is embedded. For example, the path may indicate a name of a video production and a position in the video production.

One, non-limiting, example of the use idexical trigger resource identifiers is for the <videoprod> to be an identifier of the video production in which the resource identifier is embedded and <position> to refer to an indexed position within the video production. Other examples included, one or more strings which provide only video production information or both video production and position information. Such one or more strings may themselves be easily recognizable as conveying their included information or may be the product of a hash function, transform, and/or other modification which requires data processing to render their information easily recognizable. An additional example of an indexical reference could be as a key for use with a data structure storing key-value pairs on a server. One skilled in the art having the benefit of the teachings herein will quickly appreciate many modifications, variations, and adaptations of indexical triggers as herein described which, while departing from the illustrative examples, remain within the spirit and scope of the present invention as set forth in the appended claims.

An indexical trigger allows enhancing content customization through use of parameterized resource identifiers without consuming limited bandwidth in a video production by providing a generally compact resource identifier which is mapped to a parameterized resource identifier by a sever, such as the first server 2500. The server may then redirect the parameterized resource identifier and a response can be communicated to the reproducing apparatus which uses the paramterized resource as a BASE element for further interaction. Further, an idexical trigger allows for time-appropriate enhancing content to be provided in connection with enhanced video production. A resource identifier in the indexical trigger need not address particular enhancing resources. A server such as the first server 2500, may contain easily-updatable data comprising time-appropriate enhancing resources. The server may redirect the resource identifier from the idexical trigger to one or more pages providing time-appropriate enhancing resources. Further, an indexical resource identifier allows for opporuntistic provision of enhancing content. An indexical trigger comprising a resource identifier dedicated to opportunistic enhancing content may be embedded in a video production. When it is determined to provide opportunistic enhancing content, it may be done at the server. Still further, indexical triggers may be used to facilitate internationalization of enhancing content. The resource identifier in the trigger, itself, may be neutral with respect to national or linguistic group. However, a server, the first server 2500 may gain information from header fields and associate expressions in the request about language or location information associated with a viewer or the reproducing apparatus. These may be used by the server to determine an appropriate language in which to respond. A network identifier associated with the reproducing apparatus, e.g. an IP address, may also be used to identify the country of origin of the requesting hardware and this too, may be used for suitable internationalization with indexical triggers.

Processing of the 'indexical trigger' method 5000 continues to an 'trigger URI parameter extraction' procedure 5150. The 'trigger URI parameter extraction' procedure 5150 examines the uniform resource identifier in the request 2340 for the values associated with the <videoprod> or <videoprod> and <position> quantities and extracts this information. Next, a 'trigger URI properties retrieval' procedure 5200 retrieves a first data object comprising first key-value pairs stored in data storage accessible by the server implementing the 'indexical trigger' method 5000. Using the quantities extracted from the <videoprod> or <videoprod> and <position> portions of the uniform resource identifier as a key, a 'project lookup' procedure 5250 looks for a value in the first data object associated with the key—herein termed a "project"—and a 'project properties retrieval' procedure 5300 retrieves and stores a second data object comprising second key-value pairs stored in data storage accessible by the server implementing the 'indexical trigger' method 5000.

Next, a 'parameter lookup' procedure 5350 uses a string associated with the parameters as a key with the second key-value pairs to lookup parameters associated with the project. A 'parameter storage' procedure 5400 stores a first parameter in a data structure. Conveniently, the data structure facilitates sorted retrieval, for example, a binary search tree. A 'remaining parameters' decision procedure 5450 exits through its "yes" branch if additional parameters remain in and process flow returns to the 'parameter lookup' procedure 5350 for another iteration of parameter lookup and storage. When no more parameters remain, the 'remaining parameters' decision procedure 5450 exits through its 'no' branch and processing continues to a 'second URI generation' procedure 5500. The 'second URI generation' procedure 5500 will be described in greater detail with reference to FIG. 6 below. Briefly, here, the 'second URI generation' procedure 5500 generates an uniform resource identifier comprising parameter-parameter value pairs.

Processing continues to a 'request redirection' procedure 5600 that receives the uniform resource identifier generated by the 'second URI generation' procedure 5500 and redirects the request received in the 'indexical reference request' input block 5100 to the second uniform resource identifier generated by the 'second URI generation' procedure 5500. In some embodiments of the invention the redirection is internal, that is, the redirected request is communicated directly to the server performing the 'indexical trigger' method 5000. In other embodiments, the redirection is external.

Some embodiments employing external redirection communicate a redirect message to the reproducing apparatus 2300 comprising the uniform resource identifier generated by the 'second URI generation' procedure 5500. Typically in these embodiments the reproducing apparatus 2300 then sends a redirected request to the second uniform resource identifier.

Other embodiments employing external redirection communicate the redirect message to a separate server. Such an embodiment can be further illustrated with reference to FIG. 2. Initially, the reproducing apparatus 2300 communicates the request received in the 'indexical reference request' input block 5100 via the data network 2400 to, for example, the first server 2500. Then, the first server 2500 performs steps of the 'indexical trigger' method 5000 and communicates the redirect message to the second server 2800 via the data network 2400. The second server 2800 may then perform additional processing responsive to the redirect message including, for example, steps of the 'indexical trigger' method 5000.

Whether external, internal, or other type of redirection is used in the 'request redirection' procedure 5600, processing continues to a 'response' output block 5700 that comprises a response sent to the reproducing apparatus 2300. The response may be, for example, an HTTP-compliant response message, although other data transfer protocols may be also be used. Processing completes through an 'end' terminal 5800.

Figure 6:
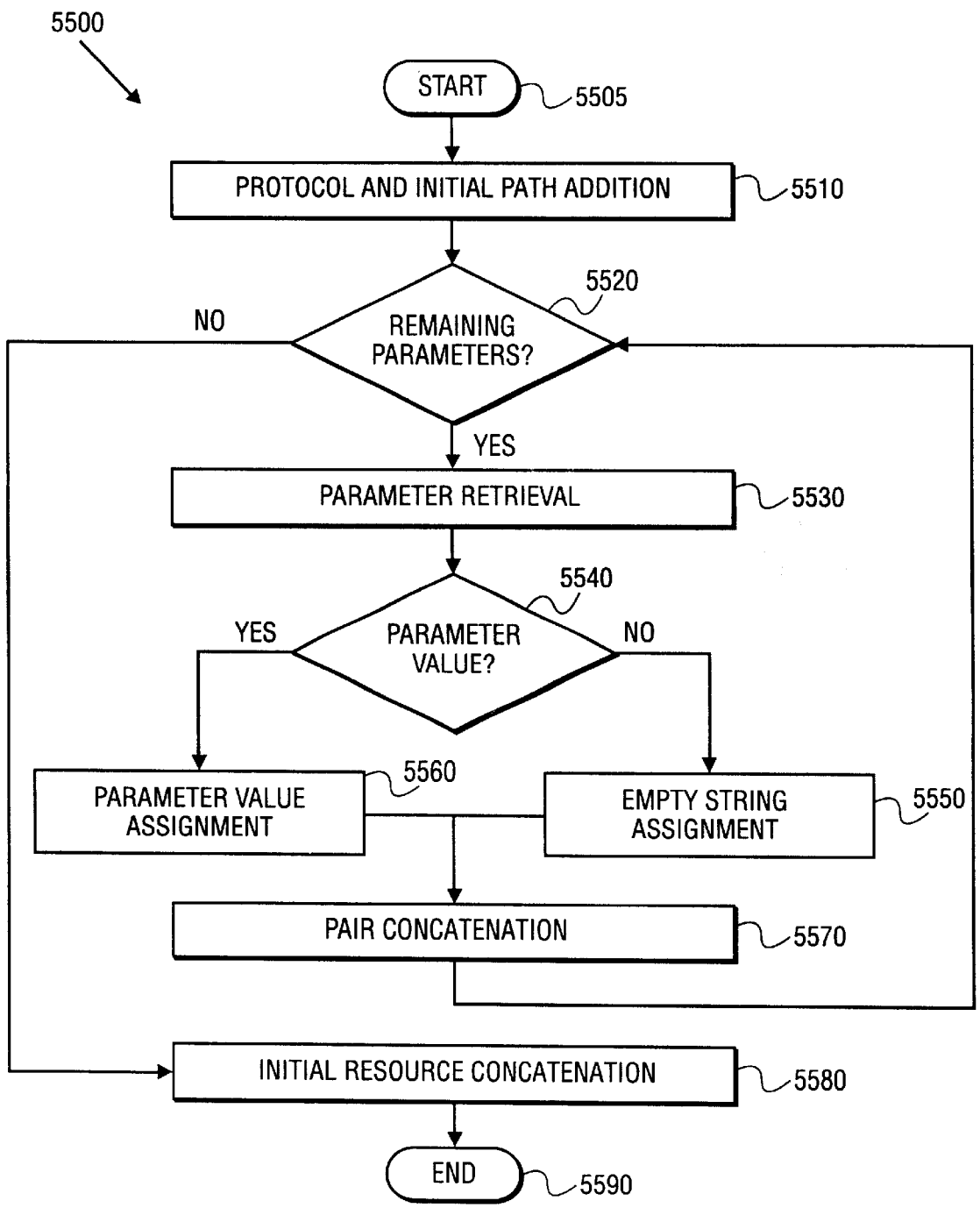
FIG. 6 depicts a flow diagram of a method for a second URI generation procedure.

Further detail of the 'second URI generation' procedure 5500 will now be provided with reference to FIG. 6. Process flow initiates at a 'start' terminal 5505 and continues to a 'protocol and initial path addition' procedure 5510. As noted above, in accordance with an illustrative embodiment, the resource identifier generated by the 'second URI generation' procedure 5500 is an uniform resource identifier. As one of skill in the art recognizes, uniform resource identifiers conventionally begin with a designation of a protocol or scheme to use in attempting retrieval of the identified resource which is followed by one or more elements of a path; accordingly, the 'protocol and initial path addition' procedure 5510 begins formation of the uniform resource identifier by adding these elements.

Process flow continues to a 'remaining parameters' decision procedure 5520 which determines if parameters remain for addition to the uniform resource identifier and thus controls exit from an iterative block comprising elements described below. Typically during a first iteration of the 'remaining parameters' decision procedure 5520 exits through its 'yes' branch and process flow continues to a 'parameter retrieval' procedure 5530 that retrieves a parameter from the data structure used with the 'parameter storage' procedure 5400. Next, a 'parameter value' decision procedure 5540 determines if a parameter value associated with that parameter is available. If so, the 'parameter value'decision procedure 5540 exits through its 'yes' branch and a 'parameter value assignment' procedure 5560 assigns a variable the parameter value; if not, the 'parameter value' decision procedure 5540 exits through its 'no' branch and an 'empty string assignment' procedure 5550 assigns the variable the value of the empty string.

Next, a 'pair concatenation' procedure 5570 concatenates the parameter-parameter value pair to the uniform resource identifier. In this step, the parameter and parameter value are separated by an equals sign ("="). Additionally, the 'parameter value assignment' procedure 5560 concatenates a "/" to divide parameter-parameter value pairs. Process flow returns to the 'remaining parameters' decision procedure 5520 to begin another iteration. When sufficient iterations have occurred to retrieve all parameters, the 'remaining parameters' decision procedure 5520 exits through its 'no' branch and process flow continues to an 'initial resource concatenation' procedure 5580.

Frequently it is desirable for an initial resource comprising references to other resources to be first presented to a user. The 'initial resource concatenation' procedure 5580 facilitates this by concatenating a designator of the initial resource to the path. Process flow completes through an 'end' terminal 5590.

To further aid in understanding the 'second URI generation' procedure 5500, a non-limiting illustration of an uniform resource identifier which could be created in accordance with an illustrative embodiment of the invention is shown by (2) below.

http://<server name>/p/<project>/<name1>=<value1>/<name2>=<value2>/<name3>=/start.html (2)

As shown in (2) quantities exemplifying particular aspects of the content URI are shown with angle-brackets <>. In (2), "http://<server name>/p/<project>" illustrates subject matter that could be added by the 'protocol and initial path addition' procedure 5510. Parameters are illustrated by <name1>, <name2>, and <name3>; parameter values are illustrated by <value1>, <value2>, and an empty string following the equals sign which follows <name3>. An initial resource designator is illustrated by "start.html" as could be added by the 'initial resource concatenation' procedure 5580. As one skilled in the art having the benefit of this disclosure will appreciate, the present invention is not limited to URIs of the length, arrangement, or form (abstractly or concretely) of the exemplary content URI in (2); nor is the present invention limited to URIs generally, rather (2) illustrates an example of a resource identifier in the form of a URI which could be created by one embodiment among many possible embodiments of the invention which lie within the spirit and scope of the invention as set forth in the appended claims.

Parameters and parameter values may be obtained from header fields and associated expressions in the request received in the 'indexical reference request' input block 5100. Exemplary header fields used with versions of the HTTP protocol are shown in table 1 below:

TABLE 1

| Accept | Range |
|---|---|
| Accept-Charset | Referer |
| Accept-Encoding | TE |
| Accept-Language | User-Agent |
| Authorization | Content-Encoding |
| Expect | Content-Language |
| From | Content-Length |

TABLE 1-continued

| Accept | Range |
|---|---|
| Host | Content-Location |
| If-Match | Content-MD5 |
| If-Modified-Since | Content-Range |
| If-None-Match | Content-Base |
| If-Range | Content-Style-Type |
| If-Unmodified-Since | Content-Type |
| Max-Forwards | Date: |
| Proxy-Authorization | Expires |
| Last-Modified | Extension-header |

In preferred embodiments of the invention, use of header fields and header field values is in compliance with the HTTP protocol available from the World Wide Web Consortium (W3C), Massachusetts Institute of Technology, Laboratory for Computer Science, Cambridge, Mass., U.S.A.

Parameters may also include information obtained from an network address associated with the reproducing apparatus 2300 including, for example, an IP address. In certain circumstances it could be possible to use this information to determine an approximate geographic location for the reproducing apparatus 2300 which may be correlated to time zones or other geographic information. Geographic or Date field information could be used infer a time zone for the reproducing apparatus 2300 initiating the request. Time zone information could then be used in conjunction with an Electronic Program Guide ("EPG") to gather additional information regarding the video production being viewed by a viewer. Some embodiments of the invention may use parameters based on an EPG alone for creating a response responsive to the broadcast context in which a request was initiated.

Conveniently, parameter-parameter value pairs are added to the content URI by the 'second URI generation' procedure 5500 in alphanumeric order by use of a data structure in the 'parameter storage' procedure 5400 which, when traversed, yields entries in such an order. In an illustrative embodiment parameters are added to the content URI with empty string parameter values when no parameter values are available. Alternative, embodiments omit parameter-parameter value pairs for which no parameter value is available. Still further, in some embodiments the second resource identifier has neither parameters nor parameter values, while in still other embodiments, the second uniform resource identifier is of other forms including those known in the art.

Parameters relating to a particular viewer or household using the reproducing apparatus 2300 to initiate the request could also be used including, for example, age, gender, other demographic or psychographic parameters. Additionally, parameters relating to financial information including, for example, known payment instruments for a viewer may also be used. Parameters relating to financial information may be conveniently used in conjunction with applications of the invention to electronic commerce.

In addition, parameters and parameter values may be carried across links by functionality analogous to using the second URI as an absolute URI that acts as a BASE element for resolving relative URIs in accordance with the HTML specification (available World Wide Web Consortium (W3C), Massachusetts Institute of Technology, Laboratory for Computer Science, Cambridge, Mass., U.S.A.).

Figure 7:
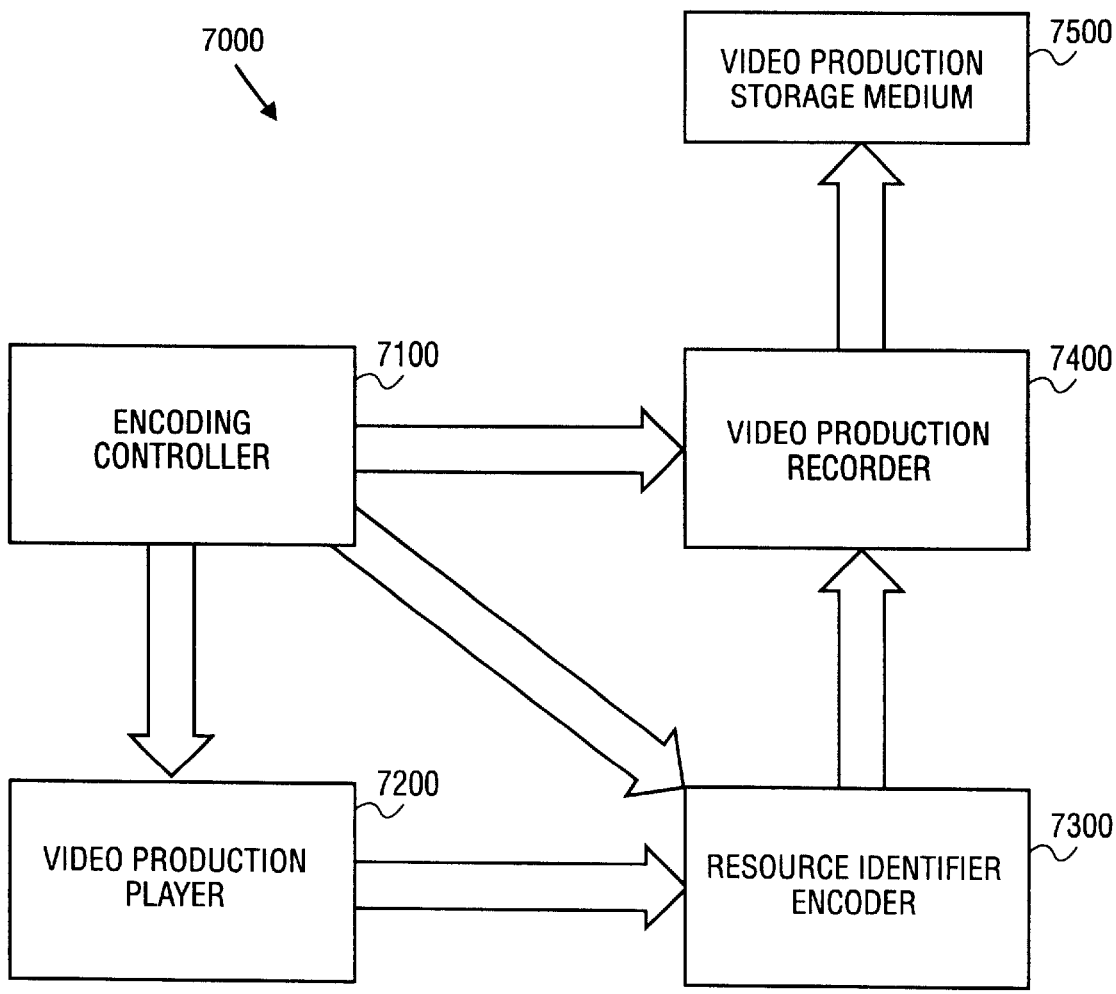
FIG. 7 depicts a block diagram of a system for encoding one or more series of resource identifiers in a video production in accordance with an illustrative embodiment.

Another aspect of the present invention involves a method and system for encoding one or more series of resource identifiers in a video production. FIG. 7 depicts 'series encoding' system 7000 for encoding one or more series of resource identifiers in a video production. The 'series encoding' system 7000 includes an encoding controller 7100. The encoding controller 7100 controls aspects of the operation of a video production player 7200, a resource identifier encoder 7300, and a video production recorder 7400. The encoding controller 7100 may be a programmed general purpose computer or may be special-purpose computing hardware.

The video production player 7200 communicates a video signal to the resource identifier encoder 7300 under the control of the encoding controller 7100. In some embodiments the video production player 7200 could be a conventional video cassette player, in other embodiments, the video production player 7200 could be a random access video player, such as a DVD player, or a computer programmed to play a video file.

The resource identifier encoder 7300 receives the video signal from the video production player 7200 as an input video signal. The resource identifier encoder 7300 receives instructions from the encoding controller 7100 for embedding resource identifiers in the input video signal. The resource identifier encoder 7300 may be conventional closed-captioning equipment. In some embodiments the resource identifiers could be embedded in the VBI of a NTSC video signal; in others they could be embedded in a synchronized companion track to the video production. The resource identifier may be portions of triggers according to CEMA standard EIA-746 or analogous standard.

The resource identifier encoder 7300 generates an output video signal that comprises the input video signal and resource identifiers embedded therein according to instructions received from the encoding controller 7100. The output video signal is communicated to a video production recorder 7400 where it is stored on a video production storage medium 7500. The video production recorder 7400 may be, for example, a conventional video cassette recorder, DVD recorder, other device capable of recording a video signal, or device capable of storing a video file. The video production storage medium 7500 is suitably chosen for operation with the video production recorder 7400.

In operation, the 'series encoding' system 7000 may work as follows. A user inputs information to the encoding controller 7100 regarding a series of resource identifiers for encoding in a video production. Next, the encoding controller 7100 determines responsive to the user input positions in the video production at which the resource identifiers should be embedded and appropriate resource identifiers for encoding at those positions. The encoding controller 7100 sends a signal to the video production player 7200, the resource identifier encoder 7300, and the video production recorder 7400 to initiate encoding. The video production player 7200 provides a video signal to the resource identifier encoder 7300.

The encoding controller 7100 is able to determine the position in the video production which is being sent from the video production player 7200 to the resource identifier encoder 7300 at any given moment. The mechanism for achieving this function may vary with the particular video production player 7200. In some embodiments, the encoding controller 7100 could be provided with the rate of playback the video production player 7200 and the encoding controller 7100 could track playback based on time. In other embodiments, the video production player 7200 could provide an output signal to the encoding controller 7100 which could be used for tracking. In still other embodiments, the video production player 7200 could provide random access and the encoding controller 7100 could provide the access position.

When the encoding controller 7100 determines that an appropriate position in the video production has been reached, the encoding controller 7100 sends a signal and the appropriate resource identifier to the resource identifier encoder 7300. The resource identifier encoder 7300 embeds the resource identifier in the input video signal received from the video production player 7200. An output is generated by the resource identifier encoder 7300 that comprises the input video signal and the embedded resource identifiers which is recorded on a video production storage medium 7500 by the video production recorder 7400.

In an illustrative embodiment the video production storage medium 7500 is a video cassette and the video production played by the video production player 7200 may also be a videocassette. In this embodiment it can be seen that operation of the 'series encoding' system 7000 takes a raw video production played by the video production player 7200 and gives to the raw video production new qualities, properties, and combinations of information. Examples of new properties may include, for example, resource identifiers encoded on the video cassette in one or more particular patterns. Examples of new qualities may include, for example, that when the video cassette is communicated to compatible equipment, the compatible, the resource identifiers configure the compatible equipment to communicate a particular request message to a data network for receipt by, for example, a server. For example, the resource identifier may be seen as instructions that configure a client computing system to perform a particular task, e.g., sending a particular request to a network. In other embodiments the video production storage medium 7500 could be other media suitable for storing a video production.

Figure 8:
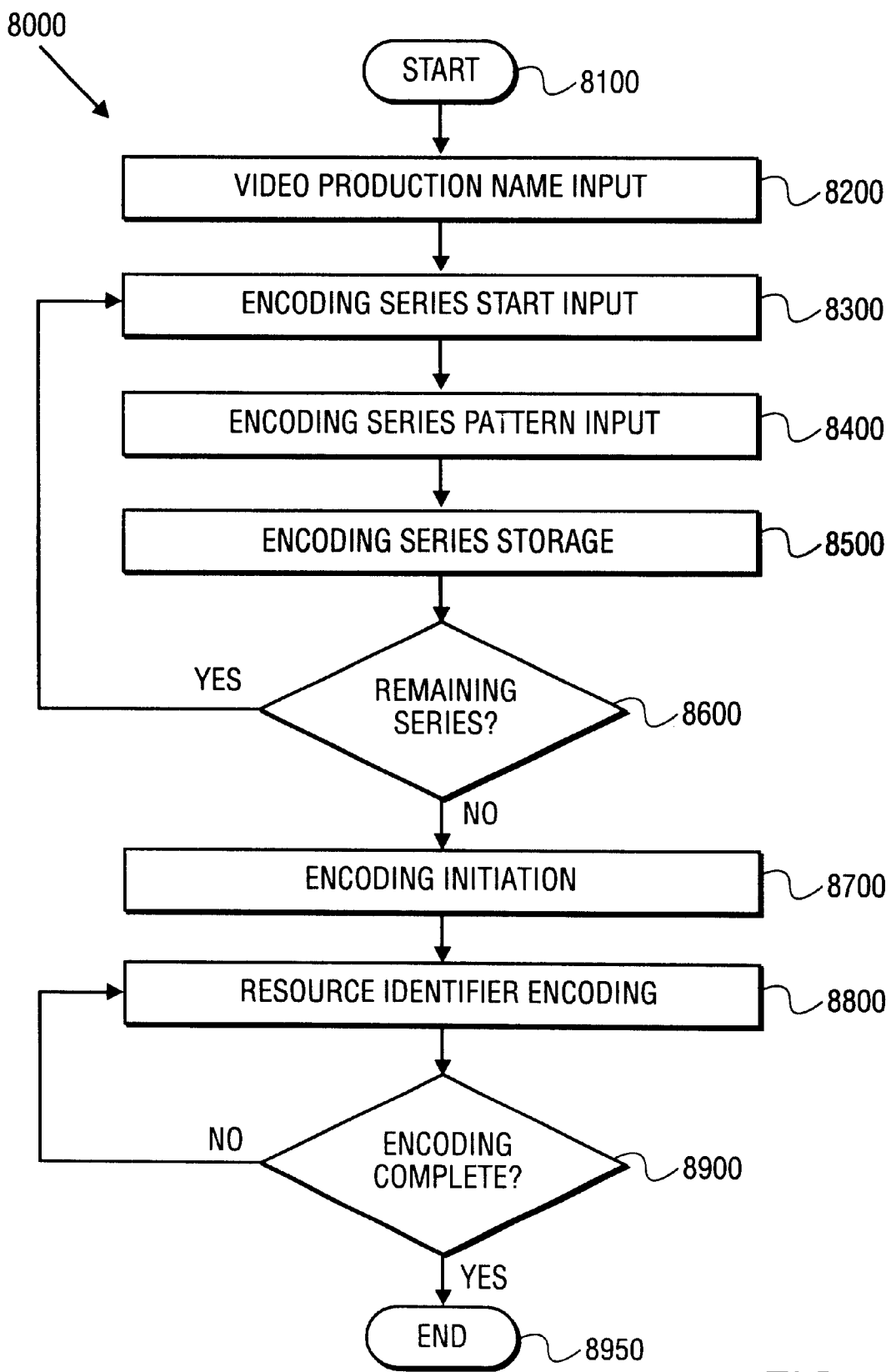
FIG. 8 depicts a flow diagram of a method for encoding one or more series of resource identifiers in a video production in accordance with an illustrative embodiment.

The 'series encoding' system 7000 is illustrative of structural elements that may perform steps of a method for encoding one or more series of resource identifiers in a video production. FIG. 8 depicts a flow diagram of a 'series encoding' method 8000 for encoding one or more series of resource identifiers in a video production in accordance with an illustrative embodiment. For purposes of illustration, reference will be made to elements of the 'series encoding' system 7000 with the understanding that in other embodiments, other suitable structures may perform steps of the 'series encoding' method 8000.

Process flow initiates at a 'start' terminal 8100 and continues to a 'video production name input' procedure 8200. The 'video production name input' procedure 8200 provides a query for a name of a video production for encoding. Queries made in the illustrative embodiment of the 'series encoding' method 8000 may be made, for example, to a user or a database. The 'video production name input' procedure 8200 then receives and stores the name. Process flow continues to an 'encoding series start input' procedure 8300 that provides a query for a first starting position for a first series. The first starting position is conveniently input as a time input, for example, 5 minutes from the start of the video production, although a displacement measure or other suitable position identifier could be used in other embodiments.

Process flow continues to an 'encoding series pattern input' procedure 8400. The 'encoding series pattern input' procedure 8400 provides a query for a first encoding pattern for the first series of resource identifiers. In some embodiments, the first encoding pattern may be a fixed interval so that elements of the first series could be placed in the video production at fixed intervals. In other embodiments a more complex pattern could be used; in some embodiments, a list of entries could be input and would thus provide the first encoding pattern.

Next, an 'encoding series storage' procedure 8500 computes the positions in the video production at which each of the first series of resource identifiers should be embedded and the appropriate resource identifiers for embedding at the positions. As noted, in some embodiments, each of the resource identifiers could be the same. In other embodiments, a portion of the resource identifiers could include a <position> portion relating to the position of the resource identifier in the video production. In still other embodiments a portion of the resource identifier could be a counting index. Many other schemes will be appreciated by one of skill in the art having the benefit of this disclosure within the spirit and scope of the invention as set forth in the appended claims. The 'encoding series storage' procedure 8500 then stores the positions in the video production at which each of the first series of resource identifiers should be embedded and the appropriate resource identifiers for embedding at the positions.

Next, a 'remaining series' decision procedure 8600 determines whether additional encoding series are desired for addition to the video production. In an illustrative embodiment the 'remaining series' decision procedure 8600 makes this determination by querying a user. If an additional encoding series is desired, the 'remaining series' decision procedure 8600 exits through its 'yes' branch and process flow return to the 'encoding series start input' procedure 8300 to receive a next starting position and a next encoding pattern. When plural encoding series are desired, the 'encoding series storage' procedure 8500 maintains an updated list of elements of the plural encoding series in order that all resource identifiers of the plural encoding series may be embedded in the video production during a single pass through the video production. When no additional encoding series are desired, the 'remaining series' decision procedure 8600 exits through its 'no' branch and process flow continues to an 'encoding initiation' procedure 8700.

The 'encoding initiation' procedure 8700 initiates the process of embedding the resource identifiers from the one or more encoding series in the video production. The 'encoding initiation' procedure 8700 sends a signal to the video production player 7200, the resource identifier encoder 7300, and the video production recorder 7400 that begins the encoding process under the control of the encoding controller 7100 that typically performs the 'encoding initiation' procedure 8700.

Process flow enters a 'resource identifier encoding' procedure 8800 that detects when a position in the video production is reached where a resource identifier should be embedded. The 'resource identifier encoding' procedure 8800 then provides a signal to the resource identifier encoder 7300 that a resource identifier should be embedded along with the resource identifier. The resource identifier encoder 7300 embeds the resource identifier. An 'encoding complete' decision procedure 8900 determines when all resource identifiers have been embedded. The 'encoding complete' decision procedure 8900 exits though its 'no' branch and loops back to the 'resource identifier encoding' procedure 8800 while resource identifiers remain to be embedded. When no resource identifiers remain to be embedded, the 'encoding complete' decision procedure 8900 exits through its 'yes' branch and process flow completes through an 'end' terminal 8950.

It will be appreciated that the 'series encoding' method 8000 could be used to encode both simple and complex patterns of resource identifier in a video production. It may be desirable for identical resource identifiers to be embedded at periodic intervals in a video production; in this way it can be assured that if a viewer joins a video production after the beginning of the video production, they will be presented with the opportunity to retrieve resources available via the resource identifier. It may further be desirable to provide resource identifiers every T1 minutes starting with the S1'th minute, for some arbitrary positive T1 and S1, e.g. every five minutes starting with the second minute of the video production. The 'series encoding' method 8000 may be used to provide such an arrangement by providing the S1'th minute in the 'encoding series start input' procedure 8300 and a fixed interval of T1 minutes in the 'encoding series pattern input' procedure 8400. Similarly it may be desirable for a first series and a second series of resource identifiers to be provided, starting with the S1'th and S2'th minutes, respectively, and continuing every T1 and T2 minutes, respectively. The 'series encoding' method 8000 may be used to provide such an arrangement by providing the S1'th minute and the T1'th interval in a first iteration of the 'encoding series start input' procedure 8300 and the 'encoding series pattern input' procedure 8400 and providing the S2'th minute and the T2'th interval in a second iteration of the 'encoding series start input' procedure 8300 and the 'encoding series pattern input' procedure 8400. One of skill in the art, having the benefit of this disclosure, will appreciate that arbitrarily complex or numerous encoding patterns may be provided in conjunction with the 'series encoding' method 8000.

All patents, patent applications, documents, standards, protocols, and draft protocols referred to herein are incorporated herein by this reference in their entirety.

Although the present invention has been described in terms of features illustrative embodiments, one skilled in the art will understand that various modifications and alterations may be made without departing from the scope of the invention. Accordingly, the scope of the invention is not to be limited to the particular embodiments discussed herein, but should be defined only by the appended claims and equivalents thereof.

What is claimed is:

1. A method for providing addressed network content in connection with an enhanced video production and a data network, said method comprising:

receiving a first request from a reproducing apparatus, said first request comprising a first resource identifier, said first resource identifier extracted from a video production communicated to said reproducing apparatus;

generating a second resource identifier responsive to said first resource identifier utilizing a parameter, the parameter being extracted from the first resource identifier; and redirecting said first request to said second resource identifier, wherein thereafter a response is communicated to said reproducing apparatus.

2. A method according to claim 1 wherein generating a second resource identifier responsive to said first resource identifier comprises:

identifying a parameter value associated with said parameter; and generating a second resource identifier comprising said parameter and said parameter value responsive to said first resource identifier.

3. A method according to claim 1 wherein generating a second resource identifier responsive to said first resource identifier comprises:

identifying a parameter of a first type and a parameter of a second type, wherein said parameter of a first type is identified responsive to a header in said first request; and identifying a first parameter value associated with said parameter of a first type and a second parameter value associated with said parameter of a second type, wherein said first parameter value is identified responsive to an expression associated with said header.

4. A method according to claim 1 wherein redirecting said first request to said second resource identifier comprises sending an internal redirect message.

5. A method according to claim 1 wherein redirecting said first request to said second resource identifier comprises sending an external redirect message.

6. A method according to claim 5 wherein said external redirect message is communicated to said reproducing apparatus.

7. A system for providing addressed network content in connection with an enhanced video production and a data network comprising:
- a video production communication device;
- a reproducing apparatus configured to receive video production from said video production communication device, said video production comprising a first resource identifier, said reproducing apparatus communicatively coupled with said data network, said reproducing apparatus further configured to extract said first resource identifier and communicate a first request comprising said first resource identifier via said data network;
- a first server communicatively coupled with said data network, said first server configured to perform steps comprising:
    - receiving said first request comprising said first resource identifier;
    - generating a second resource identifier responsive to said first resource identifier utilizing a parameter, the parameter being extracted from the first resource identifier; and
    - redirecting said first request to said second resource identifier, wherein thereafter a response is communicated to said reproducing apparatus.

8. A system according to claim 7 further comprising a second server and wherein said second resource identifier is addressable via said second server.

9. An apparatus comprising a processor, a memory, and an-input output system, programmed instructions configuring said apparatus to provide:
- a first request receiver for receiving a first request from a reproducing apparatus, said first request comprising a first resource identifier, said first resource identifier extracted from a video production communicated to said reproducing apparatus;
- a second resource identifier generator for generating a second resource identifier responsive to said first resource identifier utilizing a parameter, the parameter being extracted from the first resource identifier; and
- a first request redirector for redirecting said first request to said second resource identifier, wherein thereafter a response is communicated to said reproducing apparatus.

10. An apparatus according to claim 9 wherein the second resource identifier generator comprises:
- a parameter identifier for identifying the parameter;
- a parameter value identifier for identifying a parameter value associated with said parameter; and
- a second resource identifier generator for generating a second resource identifier comprising said parameter and said parameter value responsive to said first resource identifier.

11. An apparatus according to claim 9 wherein the second resource identifier generator comprises:
- a parameter identifier for identifying a parameter of a first type and a parameter of a second type, wherein said parameter of a first type is identified responsive to a header in said first request; and
- a parameter value identifier for identifying a first parameter value associated with said parameter of a first type and a second parameter value associated with said parameter of a second type, wherein said first parameter value is identified responsive to an expression associated with said header.

12. An apparatus according to claim 9 wherein the first request redirector comprises an internal redirector for sending an internal redirect message.

13. An apparatus according to claim 9 wherein the first request redirector comprises an external redirector for sending an external redirect message.

14. An apparatus according to claim 13 wherein said external redirect message is communicated to said reproducing apparatus.

15. An apparatus according to claim 9 wherein
- said first request receiver comprises means for receiving a first request from a reproducing apparatus, said first request comprising a first resource identifier, said first resource identifier extracted from a video production communicated to said reproducing apparatus;
- said second resource identifier generator comprises means for generating a second resource identifier responsive to said first resource identifier; and
- said first request redirector comprises means for redirecting said first request to said second resource identifier, wherein thereafter a response is communicated to said reproducing apparatus.

* * * * *